3,048,583
SYNTHESIS OF Δ¹,⁴-PREGNADIENE-17α,21-DIOL-3,20-DIONE

Bruno Camerino, Milan, Bianca Patelli, Stradella, and Domenico Cattapan, Milan, Italy, assignors to Società Farmaceutici Italia, Milan, Italy, a corporation of Italy
No Drawing. Filed Mar. 16, 1959, Ser. No. 799,418
Claims priority, application Great Britain Mar. 21, 1958
7 Claims. (Cl. 260—239.55)

The present invention relates to a new process for the synthesis of delta-1,4-pregnadiene-17-alpha-21-diol-3,20-dione, and in particular the transformation of delta-5,16-pregnadiene-1-beta,3-beta-diol-20-one into delta-1,4-pregnadiene-17-alpha,21-diol-3,20-dione (or Reichstein's delta-1-dehydro-substance "S").

The discovery of the remarkable effectiveness of prednisone or prednisolone in the treatment of various diseases, including rheumatoid arthritis, has stimulated a considerable interest in methods for preparing these compounds.

An object of the present invention is, in fact, the preparation of delta-1,4-pregnadiene-17-alpha,21-diol-3,20-dione (or Reichstein's delta-1-dehydro-substance "S") which can be then transformed into prednisolone or prednisone in a single step by fermentation with a microorganism capable of introducing an oxygenated function in position 11.

We have found that delta-1,4-pregnadiene-17-alpha-21-diol-3,20-dione can be prepared from delta-5,16-pregnadiene-1-beta,3-beta-diol-20-one by a process which is illustrated by the following equations:

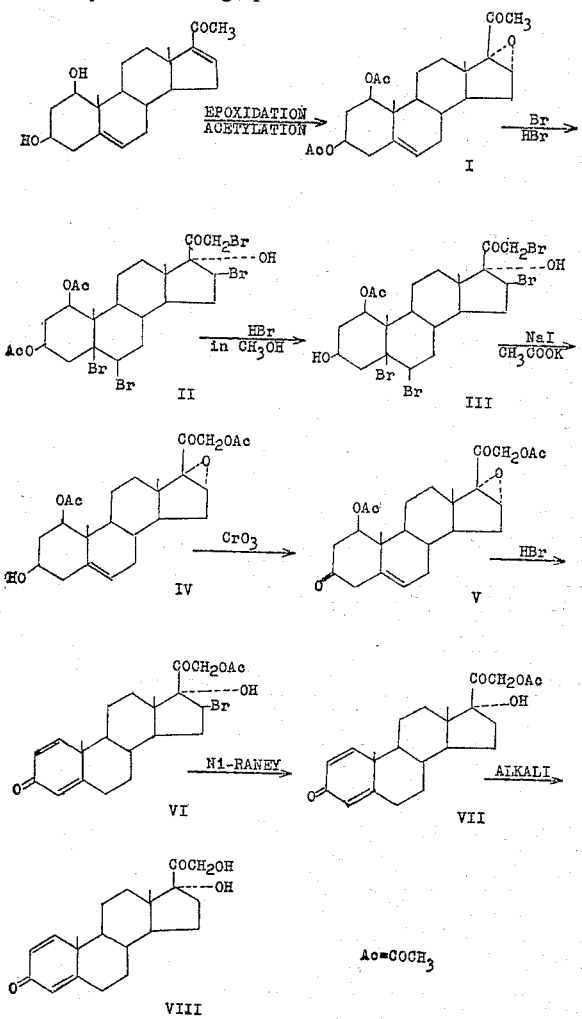

The invention provides a process for the preparation of delta-1,4-pregnadiene-17-alpha,21-diol-3,20-dione which comprises the steps of epoxidizing delta-5,16-pregnadiene-1-beta,3-beta-diol-20-one in the 16-alpha,17-alpha position followed by diacetylation to obtain 16-alpha,17-alpha-epoxy-delta-5-pregnen-1-beta,3-beta-diol-20-one-acetate (I), treating said acetate (I) with bromine and hydrobromic acid to obtain 5,6,16,21-tetrabromo-pregnan-1-beta,3-beta,17-alpha-triol-20-one-1,3-diacetate (II), selectively hydrolyzing said diacetate (II) in position 3 to obtain 5,6,16,21-tetrabromo-pregnan-1-beta,3-beta,17-alpha-triol-20-one-1-acetate (III), reacting said acetate (III) with sodium iodide and potassium acetate to obtain 16-alpha,17-alpha-epoxy-delta-5-pregnen-1-beta,3-beta,21-triol-20-one-1,21-diacetate (IV), oxidizing said diacetate (IV) to obtain 16-alpha,17-alpha-epoxy-delta-5-pregnen-1-beta,21-diol-3,20-dione-1,21-diacetate (V), reacting said diacetate (V) with hydrobromic acid to obtain 16-bromo-delta-1,4-pregnadiene-17-alpha,21-3,20-dione-21-acetate (VI), reducing said acetate (VI) to obtain delta-1,4-pregnadiene-17-alpha,21-diol-3,20-dione-21-acetate (VII) and finally hydrolyzing the acetate (VII) to obtain delta-1,4-pregnadiene-17-alpha,21-diol-3,20-dione.

The delta-5,16-pregnadiene-1-beta,3-beta-diol-20-one used as a starting material in the process may be prepared according to H. L. Lapin, Compt. rend. 244, 3065 (1957) from ruscogenine, a steroid sapogenine isolated from *Ruscus aculeatus L.*

The first step of our process may be effected by treating pure delta-5,16-pregnadiene-1-beta,3-beta,diol-20-one in methanol solution with hydrogen peroxide and alkali and acetylating the 16-alpha-,17-alpha-epoxide, thus obtained, with pyridine and acetic anhydride.

An alternative to the aforementioned step consists in the fact that 16-alpha,17-alpha-epoxy-delta-5-pregnen-1-beta,3-beta-diol-20-one diacetate (I) may be prepared, from raw delta-5,16-pregnadiene-1-beta,3-beta-diol-20-one obtained by degradation of ruscogenine, instead of starting from pure delta-5,16-pregnadiene-1-beta,3-beta-diol-20-one.

The purification of delta-5,16-pregnadiene-1-beta,3-beta-diol-20-one may thus be avoided and this constitutes a remarkable improvement in the yield and a considerable simplification of the process.

In the second step a solution of the epoxy diacetate (I) in a carbon tetrachloride/acetic acid mixture may be reacted at a temperature of from 15 to 30° C. first with bromine in carbon tetrachloride and then with hydrobromic acid in acetic acid and finally again with bromine and carbon tetrachloride, in order to obtain 5,6,16,21-tetrabromo-pregnan-1-beta,3-beta-17-alpha-diol-20-one-1,3-diacetate (II).

The selective hydrolysis of the tetrabromo-derivative to 3-alcohol may be carried out by treatment with hydrobromic acid in methanol for 20 hours at room temperature; in the next step the 3-alcohol (III), dissolved in benzene, is preferably first treated with sodium iodide in absolute ethanol and then boiled with an acetone solution of potassium acetate.

The 16-alpha,17-alpha-epoxy-delta-5-pregnen-1-beta,3-beta,21-triol-20-one-1,21-diacetate (IV) may thus be obtained with a yield of 50% calculated on the starting substance, without purifying the intermediates of the various steps.

The compound IV, dissolved in acetone may then be oxidized with a solution of chromic and sulphuric acids for 20 minutes at a temperature of from −10 to 0° C.; the 3-keto compound (V) thus obtained is preferably dissolved in acetic acid and treated at room temperature with an acetic acid solution saturated with hydrobromic acid. The acid treatment causes the displacement of the double bond from position 5 to position 4, the elimination of the acetoxy group in position 1 and at the same time the opening of the epoxy ring and the formation of a bromohydrine.

By treatment with Raney nickel (previously treated with acetone) in boiling ethanol in the presence of a very small amount of acetic acid, the bromohydrine VI may be transformed into delta-1,4-pregnadiene-17-alpha,21-diol-3,20-dione-21-acetate (VII) (or Reichstein's delta-1-dehydro-substance "S" 21-acetate).

The total yield in the steps from (IV) to (VII) is about 50%. The delta-1,4-pregnadiene-17-alpha,21-diol-3,20-dione-21-acetate thus obtained can be hydrolyzed with alkali in water/alcohol solution at room temperature, preferably in an inert atmosphere to Reichstein's delta-1-dehydro-substance "S" (VIII).

The starting materials usually employed for the synthesis of prednisone and prednisolone contain a 3-keto delta-4 group or are even saturated in the ring A.

The process of the present invention, on the contrary, gives directly with good yields, a 3-keto-delta-1,4-diene which is therefore an intermediate very useful for the synthesis of these important pharmaceutical products.

The invention further provides, as new compounds, 16,17-alpha-epoxy-delta-5-pregnen-1-beta,3-beta-diol - 20-one-diacetate (I),
5,6,16,21-tetrabromo-pregnan-1-beta, 3 - beta, 17 - alpha-triol-20-one-1,3-diacetate (II),
5,6,16,21-tetrabromo-pregnan-1-beta, 3 - beta, 17 - alpha-triol-20-one-1-acetate (III),
16,17-alpha-epoxy-delta-5-pregnen-1-beta, 3-beta, 21-triol-20-one-1,21-diacetate (IV),
16,17-alpha-epoxy-delta-5-pregnen-1-beta, 21 - diol - 3,20-dione-1,21-diacetate (V) and
16,bromo-delta-1,4-pregnadiene-17-alpha, 21 - diol - 3,20 dione-21-acetate (VI).

The following examples are given to illustrate the present invention.

EXAMPLE 1

*16-Alpha,17-Alpha-Epoxy-Delta-5-Pregnen-1-Beta,3-Beta-Diol-20-One-Diacetate (I)*

18 cc. 4 N NaOH and 35 cc. 30% $H_2O_2$ are added simultaneously to a solution of 8.7 g. delta-5,16-pregnadiene-1-beta,3-beta-diol-20-one in 540 cc. methanol, cooled to 15° C. After 4 hours in a refrigerator at 0° C., 6 cc. acetic acid are added, the whole is added to 4 liters water containing 500 g. NaCl and is extracted three times with ethyl acetate; the extract is washed first with water and NaCl and then twice with water. By evaporating the solvent a residue of 9.2 g. is obtained which is acetylated with pyridine and acetic anhydride overnight at room temperature. Ground ice is then added, the mixture is left at room temperature for 1 hour and is extracted with ethyl acetate three times. It is then washed with 2 N HCl until the reaction is acidic, then with water, and thereafter with a 10% bicarbonate solution and again with water up to a neutral reaction. By distilling off the solvent, 10.1 g. 16-alpha,17-alpha-epoxy-delta-5-pregnen-1-beta,3-beta-diol-20-one diacetate (I) having a melting point of 164–165° C., are obtained. A sample, recrystallized from acetone-petroleum ether, has a melting point of 165–166° C.

EXAMPLE 2

*16-Alpha,17-Alpha-Epoxy-Delta-5-Pregnen-1-Beta,3-Beta-Diol-20-One-Diacetate (I)*

By degrading 40 g. of a ruscogenines mixture containing 7.46% moisture (loss of weight at 100° C. under vacuum) 26 g. raw delta-5,16-pregnadiene-1-beta,3-beta-diol-20-one are obtained.

26 g. of this product are dissolved in 390 cc. methanol. At 15° C., 39 cc. 4 N NaOH and 76 cc. 33% $H_2O_2$ are added together. After 4 hours in a refrigerator (0° C. ± 2) the turbid solution is neutralized with 13 cc. acetic acid and then added to 2800 cc. of a 10% NaCl aqueous solution. After extraction with ethyl acetate the extract is washed with a saline solution and then with water. The solution is dried on sodium sulphate and evaporated. The residue is dissolved in 98 cc. pyridine and acetylated with 43.5 cc. acetic anhydride at room temperature. After 18 hours at room temperature, it is added to 700 g. ice and then left to stand at room temperature for 1 hour. After extraction with ethyl acetate, it is washed with 1 N HCl, with water, with 5% $NaHCO_3$ solution and finally with $H_2O$ until the filtrate is neutral. The residue is dried on sodium sulphate and evaporated. The dry residue is treated with 100 cc. ether and 10 cc. petroleum ether. The mixture is cooled to 0° C. and filtered; after drying at 50° C., 13.5 of a white crystalline product, having a melting point of 164–165° C. is obtained.

From the ether mother liquors, by concentration, two other portions of a product are obtained which, after crystallization from ether-petroleum ether, give a further 3.75 g. of diacetate having a melting point of 164–165° C.

A total 17.25 g. 16-alpha,17-alpha-epoxy-delta-5-pregnen-1-beta,3-beta-diol-20-one-diacetate (I) having a melting point of 164–165° C., are obtained.

EXAMPLE 3

*5,6,16,21-Tetrabromo-Pregnan-1-Beta,3-Beta,17-Alpha-Triol-20-One-1,3-Diacetate (II)*

5 g. 16-alpha,17-alpha-epoxy-delta-5-pregnen-1-beta,3-beta-diol-20-one-diacetate (I) having a melting point of 164–165° C., are dissolved in 50 cc. carbon tetrachloride and 50 cc. acetic acid in a 250-cc. 3-necked flask fitted with an agitator and a separating funnel immersed in the liquid. To this solution, kept at 18° C., 1.9 g. bromine dissolved in 15 cc. carbon tetrachloride are slowly added within 3 hours while agitating.

Half hour after this addition, 7.5 cc. of an acetic acid solution saturated with hydrobromic acid are dropped into the solution. This is then kept at room temperature for 10 minutes, 1.9 g. bromine in 15 cc. carbon tetrachloride are further added within 40 minutes, the mixture is again kept at room temperature for 15 minutes, then carbon tetrachloride is distilled off under vacuum. The reaction mixture is added to water, the precipitate is filtered, carefully washed with water and dried under vacuum. 9.12 g. 5,6,16,21-tetrabromo-pregnan-1-beta,3-beta,17-alpha-triol-20-one-1,3-diacetate (II) are obtained.

EXAMPLE 4

*5,6,16,21-Tetrabromo-Pregnan-1-Beta,3-Beta,17-Alpha-Triol-20-One-1-Acetate (III)*

9.12 g. raw 5,6,16,21-tetrabromo-pregnan-1-beta,3-beta,17-alpha-triol-20-one-1,3-diacetate (II) dissolved in 87.5 cc. anhydrous benzene, are treated with 5 g. hydrobromic acid dissolved in 95 cc. methanol for 20 hours at room temperature. The solution is poured into water and salt, is extracted with ether, the ether is washed with water until it is neutral, dried on sodium sulphate and finally vacuum distilled. A residue of 8.7 g. raw 5,6,16, 21 - tetrabromo - pregnan-1-beta,3-beta-17-alpha-triol-20-one-1-acetate (III) is obtained.

EXAMPLE 5

*16-Alpha,17-Alpha-Epoxy-Delta-5-Pregnen-1-Beta, 3-Beta,21-Triol-20-One-1,21-Diacetate (IV)*

8.7 g. raw 5,6,16,21-tetrabromo-pregnan-1-beta,3-beta, 17-alpha-triol-20-one-1-acetate (III) dissolved in 85 cc. anhydrous benzene, are treated for 24 hours at room temperature with 21 g. NaI dissolved in 85 cc. absolute ethanol. Water is then added and the mixture is extracted with ether; the ether extract is washed with a 3% sodium thiosulphate solution until iodine disappears and finally with water. After drying on sodium sulphate and vacuum distillation of the solvent a residue is obtained consisting of 7.4 g. 21-iodo-derivative which is refluxed for 4½ hours with 21 g. potassium acetate in 150 cc. acetone. After concentration under vacuum, water and salt are added and the mixture is extracted with ethyl acetate.

The organic solvent is washed with water and distilled off; the residue is crystallized from ether.

2.5 g. 16-alpha,17-alpha-epoxy-delta-5-pregnen-1-beta, 3-beta-21-triol-20-one-1,21-diacetate (IV) having a melting point of 152–154° C. are obtained. A sample, recrystallized from acetone petroleum ether, has a melting point of 154–155° C.

EXAMPLE 6

*16-Alpha,17-Alpha-Epoxy-Delta-5-Pregnen-1-Beta, 21-Diol-3,20-Dione-1,21-Diacetate (V)*

To a solution of 1 g. 16-alpha,17-alpha-epoxy-delta-5-pregnen-1-beta,3-beta,21-triol-20-one-1,21-diacetate (IV) having a melting point of 152–154° C. in 100 cc. acetone distilled on potassium permanganate and cooled to −10° C., 5 cc. of a solution containing 266 g. $CrO_3$ and 230 cc. concentrated $H_2SO_4$ per liter water are added within 5 minutes while stirring.

The mixture is stirred for 10 minutes at −10° C. and for 5 minutes at a temperature between −10° and 0° C. and is then added to water containing sodium bisulphite, and extracted three times with methylene chloride. The solvent is then washed with water until it is neutral and is finally distilled off. The residue amounts to 1 g. and, dissolved in methanol, yields 0.9 g. 16-alpha-epoxy-delta-5-pregnen-1-beta,21-diol-3,20-dione - 1,21 - diacetate (V) having a melting point of 170–171° C.

EXAMPLE 7

*16-Beta-Bromo-Delta-1,4-Pregnadiene-17-Alpha, 21-Diol-3,20-Dione-21-Acetate (VI)*

1 g. 16-alpha,17-alpha-epoxy-delta-5-pregnen-1-beta,21-diol-3,20-dione-1,21-diacetate (V) dissolved in 3 cc. acetic acid are treated for ½ hour at room temperature with 1 cc. of an acetic acid solution saturated with hydrobromic acid. After dilution with 100 cc. ice cold water, the precipitate is filtered, carefully washed with water and vacuum dried. 1 g. 16-beta-bromo-delta-1,4-pregnadiene-17-alpha,21-diol-3,20-dione-21-acetate (VI) having a melting point of 205–207° C. (with decomposition) is obtained; $\lambda_{max}$ 244mμ; $\epsilon=15,420$.

By customary connotation, the last two data signify an absorption maximum in ultraviolet light at 244mμ, and a molecular extinction coefficient $\epsilon=15,420$.

EXAMPLE 8

*Delta-1,4-Pregnadiene-17-Alpha-21-Diol-3,20 - Dione-21-Acetate (VII) (or Reichstein's Delta-1-Dehydro-Compound "S"-21-Acetate)*

1 g. 16-bromo-delta-1,4-pregnadiene-17-alpha,21-diol-3,20-dione-21-acetate (VI) are refluxed for 5 hours with 30 cc. 96°-ethanol, 0.075 cc. acetic acid and 5 g. Raney-nickel previously treated with acetone. These conditions are indispensable. In fact if Raney-nickel has not previously been treated with acetone and if acetic acid is not added, the saturated compound "S" is obtained. If Raney-nickel has been treated with acetone but is employed in the absence of acetic acid, the compound "S" is obtained (reduction of the double bond in delta-1). Finally if the reduction is carried out with Raney-nickel as such but in the presence of acetic acid, the delta-1-S-compound is obtained with low yields, that is from about ⅓ to ¼ of those obtainable according to the invention with previously treated Raney-nickel.

The catalyst is then filtered, the solvent distilled off and the residue is dissolved in ethyl acetate and washed twice with water. The ethyl acetate is distilled off and the residue is dissolved in a mixture of acetate and petroleum ether.

0.42 g. delta-1,4-pregnadiene-17-alpha,21-diol-3,20-dione-21-acetate (VII) with a melting point of 218–220° C. are obtained. The melting point, after a further recrystallization from acetone-petoleum ether, rises to 223–225° C.

EXAMPLE 9

*Delta - 1,4-Pregnadiene-17-Alpha,21-Diol-3,20-Dione (VIII) (or Reichstein's Delta-1-Dehydro-Compound "S")*

3 g. delta-1,4-pregnadiene-17-alpha,21-diol-3,20-dione-21-acetate (VII) are dissolved in 150 cc. methanol, and nitrogen is blown into the solution for 20 minutes. 0.75 g. KOH, dissolved in 6 cc. of water, are added and then the slightly colored solution is stirred under nitrogen for 5 minutes at room temperature. The solution is then neutralized with 0.8 acetic acid and introduced into a funnel containing a solution of 200 g. NaCl in 1 liter water. The whole is extracted three times with ethyl acetate and the extract is washed with water. By evaporating the solvent a residue of 2.55 g. is obtained which is crystallized from acetone. 2.15 g. delta-1,4-pregnadiene-17-alpha,21-diol - 3,20 - dione (VIII), M.P. 243–245° C. are obtained.

Moreover, in Example 1 in place of sodium hydroxide the potassium hydroxide can be used, and the acetylation can be accomplished also with acetylchloride.

In Example 3, other solvents as chloroform or methylene chloride can be substituted for carbon tetrachloride.

In Examples 4 and 5 other anhydrous solvents as methylene chloride, chloroform or carbon tetrachloride can be employed in place of benzene.

We claim:

1. A process of making 16-alpha,17-alpha-epoxy-delta[5]-pregnen-1-beta,21-diol - 3,20 - dione-1,21-diacetate, comprising oxidizing 16 - alpha,17 - alpha-epoxy-delta[5]-pregnen-1-beta-21-diol-3,20-dione - 1,21 - diacetate, comprising oxidizing 16-alpha,17-alpha-epoxy-delta[5]-pregnen-1-beta,3-beta,21-triol-20-one-1,21-diacetate, dissolved in acetone, with chromic and sulphuric acids.

2. A process of making the compound 16-beta-bromo-delta[1,4] - pregnadiene-17-alpha,21-diol-3,20-dione-21-acetate, comprising treating 16-alpha,17-alpha-epoxy-delta[5]-pregnen-1-beta,21-diol-3,20-dione-1,21-diacetate in acetic acid with hydrobromic acid, said 16-bromo compound having a melting point of 205° to 207° C., with decomposition, an absorption maximum in ultraviolet light at 244 mμ, and a molecular extinction coefficient $\epsilon=15,420$.

3. 16 - alpha,17-alpha-epoxy-delta[5]-pregnen-1-beta,21-diol-3,20-dione-1,21-diacetate.

4. A process for preparing delta-1,4-pregnadiene-17-alpha,21-diol-3,20-dione-21-acetate comprising making the compound 16-beta-bromo-delta-1,4-pregnadiene-17-alpha,21-diol-3,20-dione-21-acetate, said 16-bromo compound having a melting point of 205° to 207° C., with decomposition, an absorption maximum in ultraviolet light at 244 mμ, and a molecular extinction coefficient $\epsilon=15,420$, by treating 16-alpha,17-alpha-epoxy-delta-5-pregnen-1-beta,21-diol-3,20-dione-1,21-diacetate in acetic acid with hydrobromic acid, and then removing the 16-bromo group by treating the said compound dissolved in aqueous ethanol at boiling point with Raney-nickel in the presence of catalytic amounts of acetic acid, the Raney-nickel being pretreated with acetone.

5. A process of making 16-beta-bromo-delta-1,4-pregnadiene-17-alpha,21-diol-3,20-dione-21-acetate, said 16-bromo compound having a melting point of 205° to 207° C., with decomposition, an absorption maximum in ultraviolet light at 244 mμ, and a molecular extinction coefficient $\epsilon=15,420$, which comprises oxidizing 16-alpha,17-alpha-epoxy-delta-5-pregnene-1-beta,3 - beta, 21-triol-20-one-1,21-diacetate, dissolved in acetone, with chromic and sulfuric acids and treating the so obtained 16-alpha,17-alpha-epoxy-delta - 5 - pregnene-1 - beta,21-diol-3,20-dione-1,21-diacetate in acetic acid with hydrobromic acid.

6. A process of making the compound delta-1,4-pregnadien-17-alpha,21-diol-3,20 - dione - acetate, which comprises oxidizing 16 - alpha,17 - alpha-epoxy-delta-5-pregnen-1-beta,3-beta,21-triol-20-one-1,21-diacetate, dissolved in acetone, with chromic and sulfuric acids and treating the 16-alpha,17-alpha-epoxy-delta-5-pregnen-1-beta,21-diol-3,20-dione-1,21-diacetate, thus obtained, in acetic acid with hydrobromic acid and treating the 16-bromo-delta-1,4-pregnadien-17-alpha-21-diol-3,20 - dione-21-acetate thus obtained in ethanol at the boiling point with Raney-nickel, which nickel has been pretreated with acetone, said treating with Raney-nickel being carried out in the presence of a small amount of acetic acid.

7. The process defined in claim 6, the said compound being then hydrolyzed to delta-1,4-pregnadiene-17-alpha, 21-diol-3,20-dione, by treating with alkali in aqueous alcohol.

References Cited in the file of this patent

UNITED STATES PATENTS

| | | |
|---|---|---|
| 2,733,240 | Rosenkranz et al. | Jan. 31, 1956 |
| 2,786,837 | Farrar et al. | Mar. 26, 1957 |
| 2,789,989 | Julian et al. | Apr. 23, 1957 |
| 2,816,108 | Julian et al. | Dec. 10, 1957 |
| 2,932,639 | Oliveto et al. | Apr. 12, 1960 |

OTHER REFERENCES

Julian et al.: J. Am. Chem. Soc. 72, 367–370 (1950).

Rosenkranz et al.: J.A.C.S., vol. 72, 4081–85 (1950).

Szpilfogel et al.: Rec. Trav. Chim., vol. 75, pp. 475–480 (1956).

Lapin: Bull. Soc. Chim. (France), 1957, pp. 1237–1241.

Lapin: Bull. Soc. Chim. (France), 1957, pp. 1501–1504.

Burn et al.: J. Chem. Soc. (Gr. Br.), 1958, pp. 795–799.

Nussbaum et al.: J. Am. Chem. Soc. 81, 5230–5233 (1959).